(12) United States Patent
Orrico et al.

(10) Patent No.: US 7,793,565 B2
(45) Date of Patent: Sep. 14, 2010

(54) REACH ADJUSTMENT FOR A HANDLEBAR-MOUNTED LEVER ASSEMBLY

(75) Inventors: James Orrico, Chicago, IL (US); Milan Milosevic, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 833 days.

(21) Appl. No.: 11/681,016

(22) Filed: Mar. 1, 2007

(65) Prior Publication Data
US 2008/0210040 A1    Sep. 4, 2008

(51) Int. Cl.
F16C 1/10    (2006.01)
(52) U.S. Cl. ...................................... 74/502.2
(58) Field of Classification Search ............... 74/469, 74/491, 500.5, 501.6, 502.2
See application file for complete search history.

(56) References Cited

U.S. PATENT DOCUMENTS

| | | | |
|---|---|---|---|
| 4,611,500 A * | 9/1986 | Nagano ....................... 74/489 |
| 6,053,068 A * | 4/2000 | Yamashita et al. .......... 74/502.2 |
| 6,957,597 B2 | 10/2005 | Irie |
| 7,487,638 B2 * | 2/2009 | Tetsuka et al. ................ 60/553 |
| 7,516,616 B2 * | 4/2009 | Tetsuka et al. ................ 60/533 |
| 2003/0121262 A1 | 7/2003 | Lumpkin |
| 2005/0097979 A1 | 5/2005 | Nago |
| 2006/0070483 A1 | 4/2006 | Dimsey |
| 2008/0229863 A1 * | 9/2008 | Orrico et al. ................... 74/491 |

FOREIGN PATENT DOCUMENTS

| | | |
|---|---|---|
| DE | 24 34 300 | 1/1976 |
| DE | 3713100 A1 * | 11/1988 |
| DE | 9415887 | 2/1995 |
| EP | 0639495 | 2/1995 |
| EP | 1733958 | 12/2006 |
| GB | 2226112 | 6/1990 |
| JP | 01237282 A * | 9/1989 |
| JP | 10129293 | 5/1998 |
| JP | 2004196234 | 7/2004 |

* cited by examiner

Primary Examiner—Vicky A Johnson
(74) Attorney, Agent, or Firm—Milan Milosevic; Lisa Serdynski

(57) ABSTRACT

A reach-adjustable lever assembly that is mountable to a handlebar for actuating one of a gear-change and braking device. The lever assembly includes a lever with a finger grip pivotably connected to a housing and a reach adjust mechanism. The reach adjust mechanism includes a cam actuator and a cam. The cam actuator is rotatably supported by one of the housing and the lever. The cam is threadably connected to the cam actuator and is configured to engage the other of the housing and the lever. The cam is displaceable upon rotation of the cam actuator to pivot the lever to position the finger grip relative to the handlebar.

27 Claims, 4 Drawing Sheets

REACH ADJUSTMENT FOR A HANDLEBAR-MOUNTED LEVER ASSEMBLY

BACKGROUND OF THE INVENTION

The present invention relates to handlebar-mounted lever assemblies, and more particularly, to a lever assembly that includes a reach adjust mechanism.

Typically a lever assembly may be a brake lever assembly or a shift lever assembly. These assemblies are mountable to a handlebar for use on a bicycle and the like to actuate a control cable extending between the lever assembly and a brake or gear-change device. Alternatively, the lever assembly may be used in a hydraulic brake system or the like. Typically, the distance between the lever and the handlebar, known as the reach, is fixed and is set to accommodate an average-sized hand. Accordingly, a fixed-reach lever may be positioned too far from the handlebar for a rider with smaller hands to comfortably reach.

To solve this problem, the lever assembly may include a reach adjust mechanism. One example of a reach adjust mechanism is a removable spacer insertable between the housing and the lever. One disadvantage of spacers is that they provide only one increment of reach adjust. Another disadvantage is that the discrete spacer may be lost. Another example of a reach adjust mechanism is a screw or bolt threaded directly into the housing and engageable with the lever to position the lever relative to the handlebar. However, when the threads on the housing become worn or stripped, the entire housing has to be replaced. Therefore, there is a need for a lever reach adjust mechanism that overcomes these disadvantages.

SUMMARY OF THE INVENTION

The present invention provides a lever assembly having a reach adjust mechanism that is not threaded into the housing and provides a flexible range of adjustment. The lever assembly generally includes a housing, a lever and the reach adjust mechanism. The housing is mountable to a handlebar for actuating one of a gear-change and braking device. The lever has a finger grip and is pivotably connected to the housing. The reach adjust mechanism includes a cam actuator and a cam. The cam actuator is rotatably supported by one of the housing and the lever. The cam is threadably connected to the cam actuator and is configured to engage the other of the housing and the lever. The cam is displaceable upon rotation of the cam actuator to pivot the lever to position the finger grip relative to the handlebar.

In one embodiment of the present invention, the cam actuator is rotatably supported by the housing. The cam is nonrotatably supported by the housing and engages the lever. The cam is displaceable upon rotation of the cam actuator to pivot the lever to position the finger grip relative to the housing. The housing includes a guide nonrotatably supporting the cam. The cam is displaceable along the guide and includes a contoured surface engaging the lever. The cam actuator includes a groove for receiving a retaining ring. The retaining ring abuts a cam actuator seat in the housing to prevent the displacement of the cam actuator relative to the housing. The cam actuator may also include a tool interface for rotating the cam actuator. The lever may further include a seat for operatively connecting one end of a link assembly for actuating one of the gear-change and braking device. The link assembly may include a Bowden cable or a hydraulic hose or the like.

In another embodiment of the present invention, the cam actuator is rotatably supported by the lever and is displaceable relative to the cam. The cam is nonrotatably supported by the lever and is configured to engage the housing. The lever may include a lever guide nonrotatably supporting the cam, the cam configured to displace along the lever guide. The cam actuator includes a groove for receiving a retaining ring. The retaining ring abuts a cam actuator seat in the lever to prevent the displacement of the cam actuator relative to the lever.

In another embodiment of the present invention, the reach adjust mechanism includes a cam follower, a cam actuator and a cam, the cam follower disposed on the lever. The cam actuator is rotatably supported by the housing. The cam is threadably connected to the cam actuator and is configured to engage the cam follower. The cam may include a contoured surface configured to engage the cam follower of the lever. The cam is nonrotatably supported by the housing and displaceable along the housing upon rotation of the cam actuator to pivot the lever to position the finger grip relative to the handlebar.

These and other features and advantages of the present invention will be more fully understood from the following description of one or more embodiments of the invention, taken together with the accompanying drawings.

DETAILED DESCRIPTION

Figure 1:
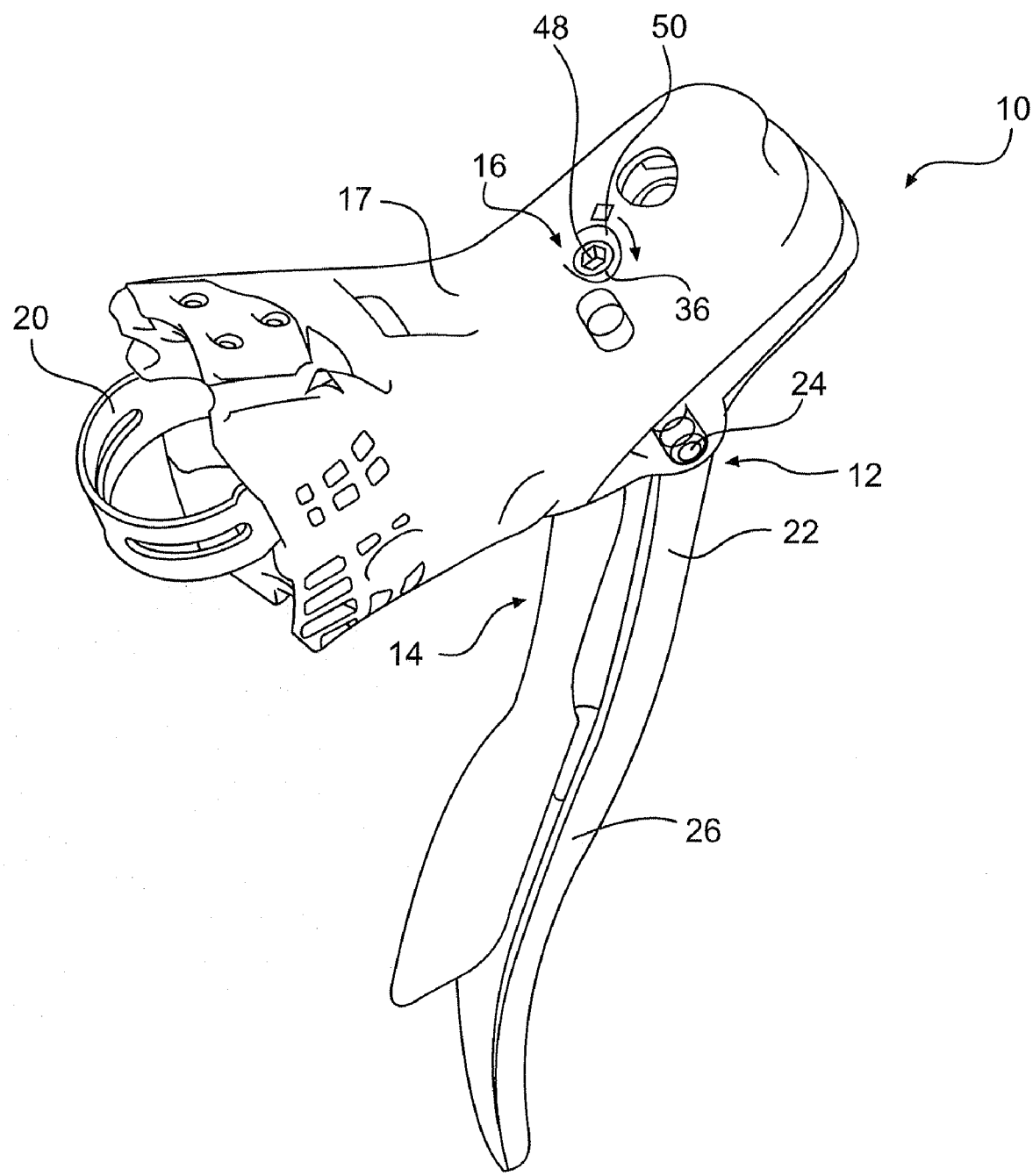
FIG. 1 is a perspective view of a bicycle control apparatus including a brake lever assembly having a reach adjust mechanism according to one embodiment of the present invention.
Figure 2:
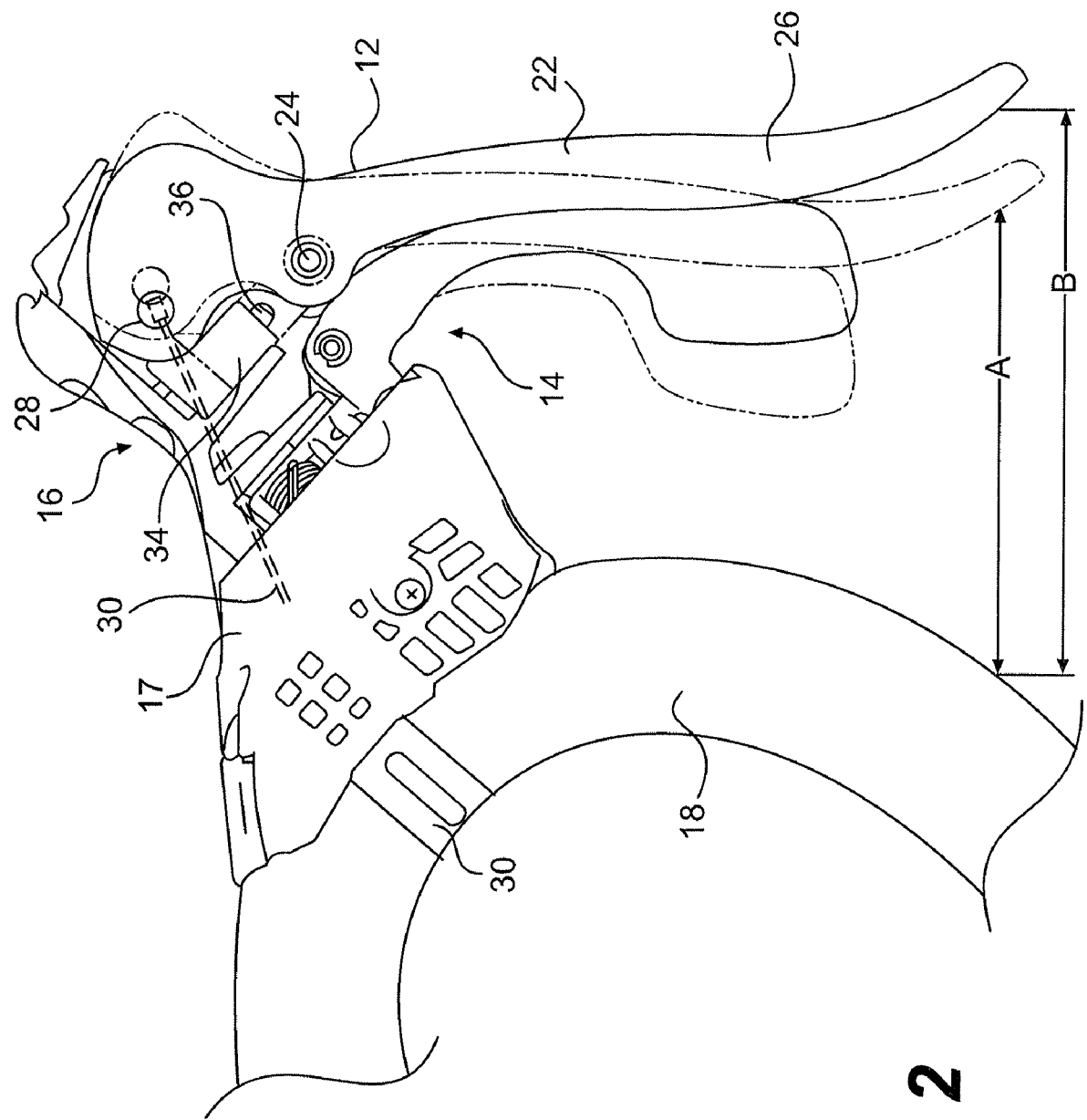
FIG. 2 is a side view of the bicycle control apparatus of FIG. 1 with a housing partially cut away to show two reach-adjustable positions of the brake lever relative to a handlebar.
Figure 3:
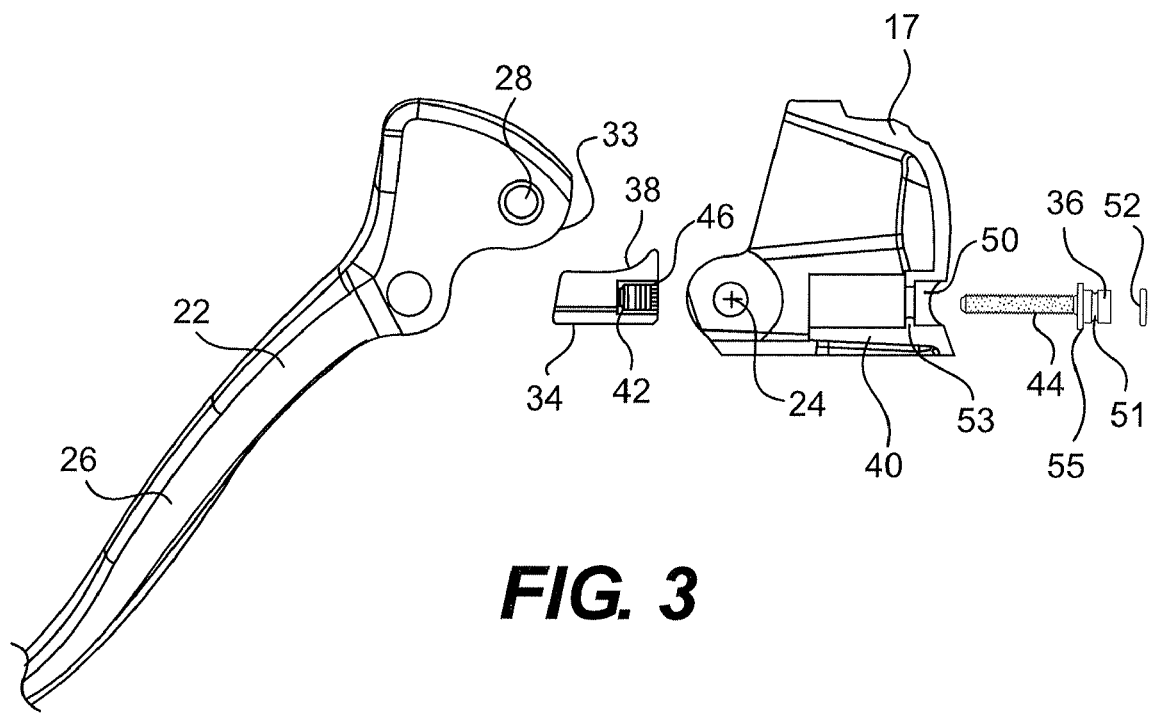
FIG. 3 is an exploded view of the brake lever assembly of FIG. 1.

FIGS. 1-3 illustrate a bicycle control apparatus 10 including a brake lever assembly 12 and a shift lever assembly 14. The brake lever assembly 12 includes a reach adjust mechanism 16 according to one embodiment of the present invention. Alternatively, the shift lever assembly 14 may also be configured to include the reach adjust mechanism 16. In the embodiment shown, the brake lever assembly 12 is integrated with a shift lever assembly 14 into the same bicycle control apparatus. Alternatively, the brake lever assembly 12 may be formed separately from the shift lever assembly 14. Looking to FIGS. 1-3, the bicycle control apparatus 10 includes a housing 17 mountable to a handlebar 18, typically a drop-style handlebar found on a road bike, by a clamp 20. The brake lever assembly 12 generally includes a brake lever 22 and the reach adjust mechanism 16. The brake lever 22 is rotatable about a shaft or pivot axis 24 and may be biased toward a rest position by a preloaded return spring. The brake lever 22 includes a finger grip 26 and seat 28 for receiving one end of a brake cable 30. The other end of the brake cable 30 is connected to a braking device (not shown). The brake lever 22 is pivotable toward the handlebar 18 to pull the brake cable 30 to slow the bicycle.

Looking to FIGS. 2 and 3, the reach adjust mechanism 16 includes a cam follower 33, a cam 34 and a cam actuator 36. In this embodiment, the cam 34 is nonrotatably supported by the housing 17 and configured to engage the cam follower 33 of the lever 22. Preferably, the cam 34 includes a contoured surface 38 to engage the cooperating cam follower 33 of the brake lever 22. The contoured surface 38 may be linear, nonlinear or any combination thereof to achieve the desired lever rotation per increment of cam displacement. The cam 34 displaces along a guide 40 of the housing 17, the guide 40 configured to prevent rotation of the cam 34 during rotation of the cam actuator 36. The cam 34 includes a threaded portion 42 for receiving a mating threaded portion 44 of the cam actuator 36. In this embodiment, the threaded portion 42 of the cam 34 is an insert 46 that is tapped or press fit into the cam 34. Alternatively, the cam threaded portion 42 and the cam 34 may form one piece.

In this embodiment, the cam actuator 36 is a threaded bolt that is rotatably supported by the housing 17. The cam actuator 36 includes a tool interface 48 (see FIG. 1) at one end that is configured to receive a tool such as an Allen wrench. The housing 17 includes an opening 50 to easily access the tool interface 48 without disassembling the brake lever assembly 12. The cam actuator 36 includes a groove 51 for receiving a retaining ring 52. The retaining ring 52 and a flange or shoulder 55 of the bolt 36 abut and sandwich therebetween a cam actuator seat 53 to prevent the bolt 36 from displacing relative to the housing 17. Although shown as an annular ring, the retaining ring 52 may be configured into any shape or form that provides like support for the cam actuator 36.

Figure 4:
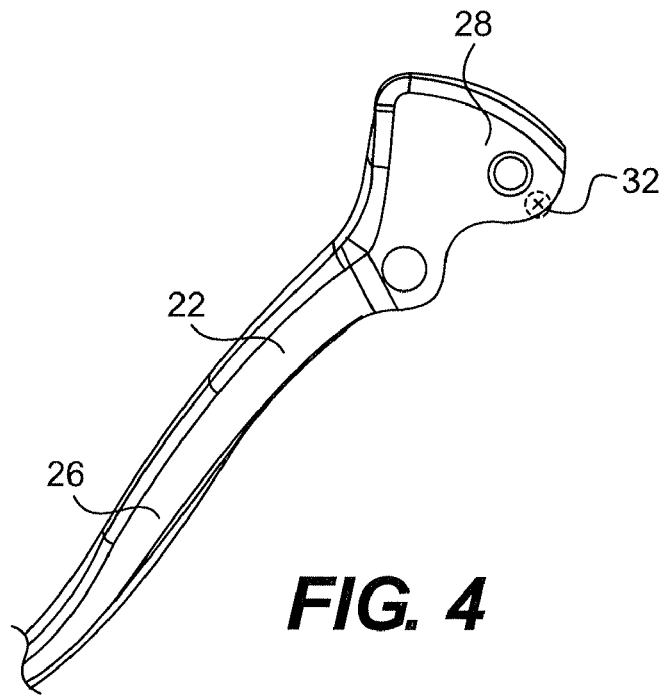
FIG. 4 is a side view of a brake lever according to another embodiment of the present invention.

In this embodiment, a rider may adjust the distance between the finger grip 26 and handlebar 18 by rotating the cam actuator 36 clockwise to accommodate a smaller hand. As the cam actuator 36 is rotated, the cam 34 displaces along the guide 40 of the housing 17. The displacing cam slides along the cam follower 33 of the brake lever 22 to change the engagement point between the cam follower 33 and the cam 34, causing the brake lever 22 to rotate about is pivot axis 24. In an alternative embodiment of the invention, the engagement between the cam 34 and cam follower 33 may include a roller contact 32 to reduce friction (FIG. 4). In FIG. 2, the dashed lines show the brake lever 22 in a reduced reach position, a distance A from the handlebar 18. The rider may increase the reach to accommodate a larger hand by rotating the cam actuator 36 counterclockwise. The solid lines show the brake lever 22 in an extended reach position, a distance B from the handlebar 18. As configured, the reach adjust mechanism allows the brake lever 22 to be infinitely positioned to accommodate a broad range of reach requirements. The relationship between the rotation of the cam actuator 36 and the rotation of the lever 22 may be linear, nonlinear or any combination thereof. Additionally, the cooperating threads 42, 44 of the cam 34 and cam actuator 36 are preferably configured to not be back-drivable to protect against unwanted bolt rotation, and in turn, unwanted lever reach adjust caused by vibrations and other loading while riding. Additionally, a self-locking patch element may be bonded onto the threads 44 of the actuator cam 36. When engaged with the mating threads 42 of the cam 34, the patch element is deformably compressed creating a counterforce to establish a stronger threaded contact, adding positive resistance to vibration and loosening.

Figure 5:
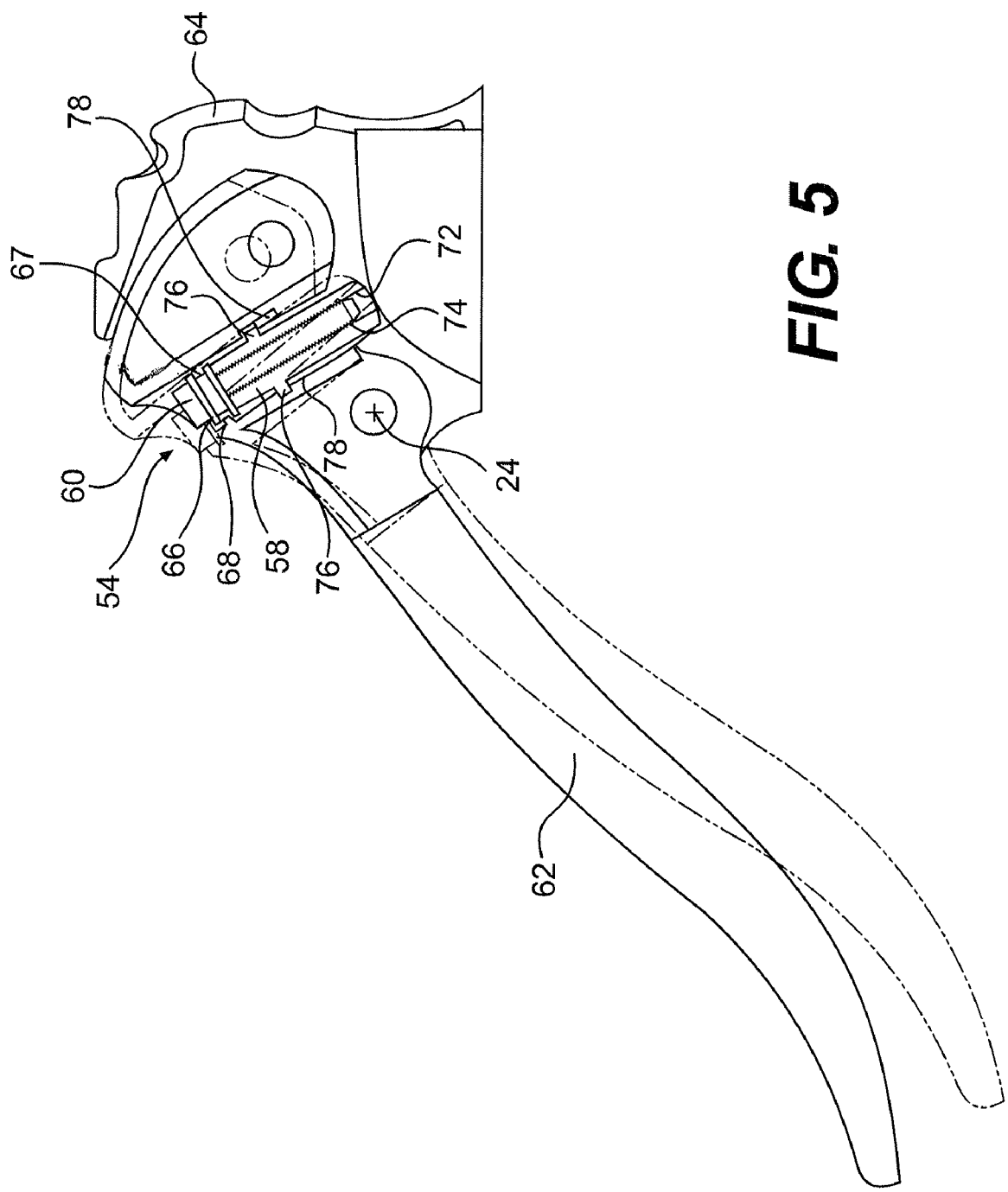
FIG. 5 is a partial sectional view of a brake lever assembly having a reach adjust mechanism according to another embodiment of the present invention, also showing two reach-adjustable positions of the brake lever relative to the handlebar.

FIG. 5 illustrates another embodiment of a reach adjust mechanism 54 for a lever 62. The reach adjust mechanism 54 includes a cam 58 and a cam actuator 60, the cam actuator 60 also preferably shown as a threaded adjust bolt. The cam actuator 60 includes a groove 66 for receiving a retaining ring 68. The retaining ring 68 abuts a cam actuator seat 67 in the lever 62 to prevent the displacement of the cam actuator 60 relative to the lever 62. The cam 58 includes a threaded bore 72 for receiving a threaded portion 74 of the cam actuator 60. The cam 58 is nonrotatably supported by the lever 62 and is configured to engage a housing 64. Preferably, the cam 58 includes a projection or paired wings 76 displaceable along a guide or paired grooves 78 of the lever 62 to nonrotatably support the cam 58 in the lever 62. In FIG. 5, the solid lines show the lever 62 in a first reach position. When the cam actuator 60 is rotated, the cam actuator 60 displaces relative to the cam 58 causing the lever 62 to rotate about its pivot axis 24 to a second reach position shown in the dashed lines.

While this invention has been described by reference to one or more preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed:

1. A reach-adjustable lever assembly mountable to a handlebar for actuating one of a gear-change and braking device, the reach-adjustable lever assembly comprising:
   a housing mountable to the handlebar;
   a lever with a finger grip pivotably connected to the housing; and
   a reach adjust mechanism including:
      a cam actuator rotatably supported by one of the housing and the lever;
      a cam follower on the other of the housing and the lever; and
      a cam threadably connected to the cam actuator and slidably displaceable along the cam upon rotation of the cam actuator to pivot the lever to position the finger grip relative to the handlebar.

2. The reach-adjustable lever assembly according to claim 1, wherein the cam actuator is rotatably supported by the housing, the cam nonrotatably supported by the housing and configured to engage the lever, the cam displaceable along the housing upon rotation of the cam actuator to pivot the lever to position the finger grip relative to the handlebar.

3. The reach-adjustable lever assembly according to claim 2, wherein the housing includes a guide nonrotatably supporting the cam, the cam displaceable along the guide.

4. The reach-adjustable lever assembly according to claim 3, wherein the lever further includes a seat for operatively connecting one end of a link assembly for actuating one of the gear-change and braking device.

5. The reach-adjustable lever assembly according to claim 4, wherein the cam has a contoured surface engaging the lever.

6. The reach-adjustable lever assembly according to claim 5, wherein the cam actuator includes a groove for receiving a retaining ring, the retaining ring abutting a cam actuator seat in the housing to prevent the displacement of the cam actuator relative to the housing.

7. The reach-adjustable lever assembly according to claim 6, wherein the cam actuator includes a tool interface for rotating the cam actuator.

8. The reach-adjustable lever assembly according to claim 2, wherein the cam has a contoured surface engaging the lever.

9. The reach-adjustable lever assembly according to claim 2, wherein the cam actuator includes a groove for receiving a retaining ring, the retaining ring abutting a cam actuator seat in the housing to prevent the displacement of the cam actuator relative to the housing.

10. The reach-adjustable lever assembly according to claim 1, wherein the cam actuator is rotatably supported by the lever, the cam nonrotatably supported by the lever and configured to engage the housing, the cam actuator displaceable relative to the cam upon rotation of the cam actuator to pivot the lever to position the finger grip relative to the handlebar.

11. The reach-adjustable lever assembly according to claim 10, wherein the lever includes a lever guide nonrotatably supporting the cam, the cam displaceable along the lever guide.

12. The reach-adjustable lever assembly according to claim 11, wherein the lever further includes a seat for operatively connecting one end of a link assembly for actuating one of the gear-change and braking device.

13. The reach-adjustable lever assembly according to claim 12, wherein the cam actuator includes a groove for receiving a retaining ring, the retaining ring abutting a cam actuator seat in the lever to prevent the displacement of the cam actuator relative to the lever.

14. The reach-adjustable lever assembly according to claim 13, wherein the cam actuator includes a tool interface for rotating the cam actuator.

15. The reach-adjustable lever assembly according to claim 10, wherein the cam actuator includes a groove for receiving a retaining ring, the retaining ring abutting a cam actuator seat in the lever to prevent the displacement of the cam actuator relative to the lever.

16. The reach-adjustable lever assembly according to claim 1, wherein the cam actuator includes a tool interface for rotating the cam actuator.

17. The reach-adjustable lever assembly according to claim 1, wherein the lever further includes a seat for operatively connecting one end of a link assembly for actuating one of the gear-change and braking device.

18. A reach adjustable lever assembly mountable to a handlebar for actuating one of a gear-change and brake device, the reach-adjustable lever assembly including:
    a housing mountable to the handlebar;
    a lever with a finger grip pivotably connected to the housing; and
    reach adjust means including:
        cam actuator means rotatably supported by one of the housing and the lever;
        cam follower means on the other of the housing and the lever; and
        cam means threadably connected to the cam actuator means and slidably displaceable along the cam follower means upon rotation of the cam actuator means to pivot the lever to position the finger grip relative to the handlebar.

19. The reach-adjustable lever assembly according to claim 18, wherein the cam actuator means is rotatably supported by the housing, the cam means nonrotatably supported by the housing and configured to engage the lever, the cam means displaceable along the housing upon rotation of the cam actuator means to pivot the lever to position the finger grip relative to the handlebar.

20. The reach-adjustable lever assembly according to claim 19, wherein the housing includes a guide nonrotatably supporting the cam means, the cam means displaceable along the guide.

21. The reach-adjustable lever assembly according to claim 19, wherein the cam means has a contoured surface engaging the lever.

22. The reach-adjustable lever assembly according to claim 19, wherein the cam actuator means includes a groove for receiving retaining means, the retaining means abutting a cam actuator seat in the housing to prevent the displacement of the cam actuator means relative to the housing.

23. The reach-adjustable lever assembly according to claim 18, wherein the cam actuator means is rotatably supported by the lever, the cam means nonrotatably supported by the lever and configured to engage the housing, the cam actuator means displaceable relative to the cam means upon rotation of the cam actuator means to pivot the lever to position the finger grip relative to the handlebar.

24. The reach-adjustable lever assembly according to claim 23, wherein the lever includes a lever guide nonrotatably supporting the cam means, the cam means displaceable along the lever guide.

25. The reach-adjustable lever assembly according to claim 23, wherein the cam actuator means includes a groove for receiving retaining means, the retaining means abutting a cam actuator seat in the lever to prevent the displacement of the cam actuator means relative to the lever.

26. The reach-adjustable lever assembly according to claim 18, wherein the cam actuator means includes a tool interface for rotating the cam actuator means.

27. The reach-adjustable lever assembly according to claim 18, wherein the lever further includes attachment means for operatively connecting one end of a link assembly for actuating one of the gear-change and braking device.

* * * * *